United States Patent
Ueno

(10) Patent No.: US 10,916,026 B2
(45) Date of Patent: Feb. 9, 2021

(54) SYSTEMS AND METHODS OF DETERMINING STEREO DEPTH OF AN OBJECT USING OBJECT CLASS INFORMATION

(71) Applicant: Toyota Research Institute, Inc., Los Altos, CA (US)

(72) Inventor: Junya Ueno, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 199 days.

(21) Appl. No.: 15/929,016

(22) Filed: May 16, 2018

(65) Prior Publication Data

US 2019/0355140 A1 Nov. 21, 2019

(51) Int. Cl.
  *G06T 7/593* (2017.01)
  *G06K 9/00* (2006.01)
  *H04N 13/239* (2018.01)

(52) U.S. Cl.
  CPC .......... *G06T 7/593* (2017.01); *G06K 9/00791* (2013.01); *G06T 2200/04* (2013.01);
  (Continued)

(58) Field of Classification Search
  CPC .............. G06T 7/593; G06T 2200/04; G06T 2207/10012; G06T 2207/30252; G06T 5/20; G06K 9/00791; G06K 9/00201; G06K 9/00805; H04N 13/239; B60R 21/013; B60R 21/0134; G01S 3/7864
  See application file for complete search history.

(56) References Cited

U.S. PATENT DOCUMENTS 5,577,130 A   11/1996  Wu
7,660,436 B2   2/2010  Chang et al.
(Continued)

FOREIGN PATENT DOCUMENTS

JP    2009115803    5/2009
WO    2003/019234   3/2003

OTHER PUBLICATIONS

Depth from stereo, CSC420, 2014 http://www.cs.toronto.edu/-fidler/slides/2015/CSC420/lecture12_hres.pdf (Year: 2014).*

(Continued)

*Primary Examiner* — Jianxun Yang
(74) *Attorney, Agent, or Firm* — Christopher G. Darrow; Darrow Mustafa PC

(57) ABSTRACT

Systems, methods, and other embodiments described herein relate to a method of determining stereo depth of an object. One method includes obtaining an image captured with a stereo camera arrangement. The stereo camera arrangement can be installed in one of a vehicle and a robotic apparatus, for example. The image captures a portion of the environment associated with the stereo camera arrangement. The method can further include identifying an object in the image, determining an object class for the object, determining a size parameter of the object, determining a size parameter of the object class, determining a maximum disparity for the object with the size parameter of the object and the size parameter of the object class, and determining a stereo depth of the object based on the maximum disparity.

18 Claims, 5 Drawing Sheets

(52) U.S. Cl.
CPC .............. *G06T 2207/10012* (2013.01); *G06T 2207/30252* (2013.01); *H04N 13/239* (2018.05)

(56) References Cited

U.S. PATENT DOCUMENTS

| | | |
|---|---|---|
| 7,974,748 B2 | 7/2011 | Goerick et al. |
| 8,108,119 B2 | 1/2012 | Southall et al. |
| 8,351,653 B2 | 1/2013 | Nishigaki |
| 8,583,313 B2 | 11/2013 | Mian |
| 9,094,661 B2 | 7/2015 | Venkataraman et al. |
| 9,800,859 B2 | 10/2017 | Venkataraman et al. |
| 2005/0131646 A1* | 6/2005 | Camus ................. B60R 21/013 701/301 |
| 2012/0269384 A1* | 10/2012 | Jones ................. G06K 9/00201 382/103 |
| 2015/0172631 A1 | 6/2015 | Kasahara |
| 2018/0027224 A1* | 1/2018 | Javidnia ............... H04N 13/239 382/154 |

OTHER PUBLICATIONS

Depth from stereo, CSC420, 2014, R1 http://www.cs.toronto.edu/-fidler/slides/2015/CSC420/lecture12_hres.pdf (Year: 2014).*

Rosebrock, Adrian, "Find Distance from Camera to Object/Marker using Python and OpenCV" (the Article), Jan. 19, 2015, printed from https://www.pyimagesearch.com/2015/01/19/find-distance-camera-objectmarker-using-python-ppencv/, on May 9, 2018 in 67 pages.

Krishnan, Amrit et al., "Vehicle Detection and Road Scene Segmentation using Deep Learning", 2016, Chalmers University of Technology, Gothenburg, Sweden in 73 pages.

Unknow, "Depth Estimation from Stereo Cameras", printed from from http://www.cs.tut.fi/~suominen/SGN-1656-stereo/stereo_instructions.pdf on May 9, 2018 in 6 pages.

* cited by examiner

SYSTEMS AND METHODS OF DETERMINING STEREO DEPTH OF AN OBJECT USING OBJECT CLASS INFORMATION

TECHNICAL FIELD

The subject matter described herein relates generally to systems and methods of determining stereo depth and, more specifically, using a disparity valuation between stereo images as part of the stereo depth calculation.

BACKGROUND

In traditional stereo vision, two cameras can be displaced horizontally from one another and used to obtain two differing views of a scene. By comparing these two images, the relative depth information can be obtained in the form of a disparity map, which encodes the difference in horizontal coordinates of corresponding image points. The values in this disparity map are inversely proportional to the stereo depth at corresponding pixel locations. Accordingly, the stereo depth can be estimated utilizing stereo vision. However, a cost function for the creating the disparity map is calculated from a first disparity (e.g., zero (0)) to a second disparity. The calculation of the cost function up to the second disparity for every pixel delays in processing time.

SUMMARY

An example of a stereo depth determination system for reducing processing time is presented herein. The system is based on an object detection that includes a bounding perimeter (e.g., a bounding box) with class information (e.g., car, bus, pedestrian, etc.). The system is further based on a parameter (e.g., width) of the bounding perimeter as a prior for stereo depth estimation. The system assumes that an object class has a minimum real-world width. This minimum real-world width can reduce maximum disparity, which can lead to a reduced processing time.

In one embodiment, a system for determining stereo depth of an object is disclosed. The system includes a processor and a memory communicably coupled to the processor. The memory stores an identification module including instructions that when executed by the processor causes the processor to identify an object in an image and determine an object class for the object. The image captures a portion of an environment and the image is captured with a stereo camera arrangement. The memory also stores a maximum disparity determination module including instructions that when executed by the processor cause the processor to determine a size parameter of the object, determine a size parameter of the object class and determine a maximum disparity for the object with the size parameter of the object and the size parameter of the object class. The memory further stores a stereo depth determination module including instructions that when executed by the processor cause the processor to determine a stereo depth of the object based on the image and the maximum disparity.

In another embodiment, a non-transitory computer-readable medium for determining stereo depth of an object. The computer-readable medium stores instructions that when executed by a processor cause the processor to perform the disclosed functions. The instructions include instructions to obtain an image captured with a stereo camera arrangement, identify an object in the image, determine an object class for the object, determine a size parameter of the object, determine a size parameter of the object class, determine a maximum disparity for the object with the size parameter of the object and the size parameter of the object class, and determine a stereo depth of the object based on the maximum disparity.

In yet another embodiment, a method of determining stereo depth of an object is disclosed. The method includes obtaining an image captured with a stereo camera arrangement, the image capturing part of an environment. The method further includes identifying an object in the image, determining an object class for the object, determining a size parameter of the object, determining a size parameter of the object class, determining a maximum disparity for the object with the size parameter of the object and the size parameter of the object class, and determining a stereo depth of the object based on the maximum disparity.

DETAILED DESCRIPTION

Figure 1:
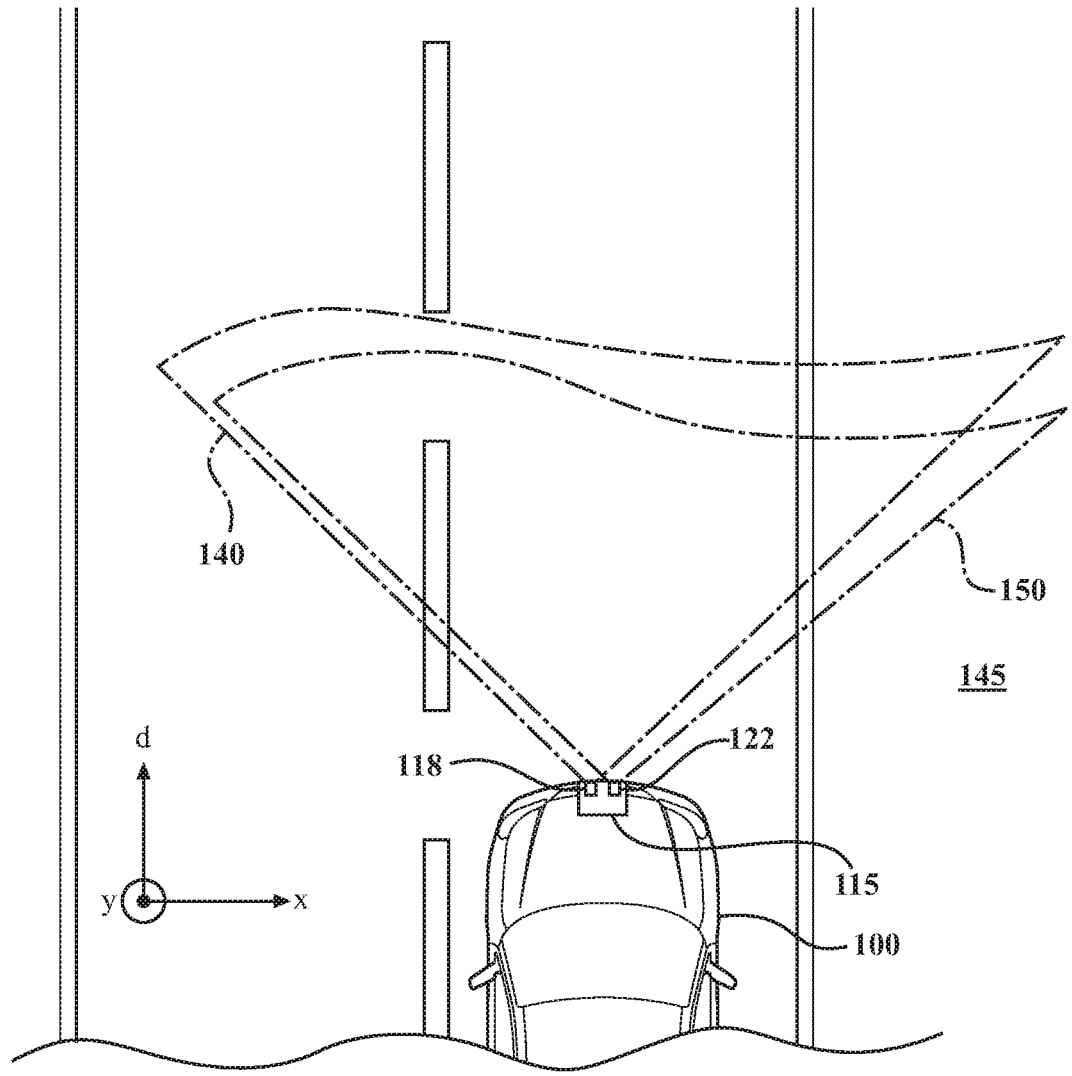
FIG. 1 shows a top view of a vehicle capturing a stereo image of portions of an environment.

Systems, methods, and other embodiments for stereo depth determination are disclosed herein and can be used in many robotic and/or vehicular applications where an accurate distance is needed or desired. As one example, the described arrangements can be implemented on a vehicle and used for detecting a distance to an object in an environment. An object is a thing that forms an element of or constitutes the subject matter of an investigation. Example objects detected by the vehicle include a car, a bus, a truck, a trailer, a pedestrian, an animal, a road sign, etc. The vehicle can then determine a travel path based, at least, on the distance to the object. The vehicle can then control one or more vehicle actuators to implement the determined travel path. As another example, the described arrangements can be implemented on a robot, and can be used for detecting a distance to an object in the environment. The robot can then determine one or more maneuvers based on the object. The maneuvers can include, for instance, handling the object, avoiding the object, etc. The robot can then control one or more robotic actuators to implement the determined maneuvers. While the detailed arrangements discussed below are described in connection with a vehicle, one skilled in the art can apply the invention to robotic apparatus. Moreover, the described arrangements can be used in other advanced control apparatus for controlling actuators.

In one embodiment, a stereo depth determination system is implemented in an apparatus (e.g., a vehicle). The vehicle includes a stereo camera having a first lens separated a distance, b, from a second lens. The stereo camera uses the first lens to capture a first image of a portion of an environment and the second lens to capture a second image of a portion of the environment. The second image will be slightly different from the first image due to the second and first lens being displaced by the distance, b. The stereo depth of an object in the two captured images can be determined through the use of a disparity map. To create the disparity map, a cost function can be used. The cost function for a location (e.g., a pixel) is calculated from a minimum disparity (e.g., zero (0)) to a maximum disparity $D_{max}$. The stereo depth determination system can use an identification module and a maximum disparity determination module for determining the maximum disparity $D_{max}$. In one implementation, the identification module identifies an object (e.g., a bus) in the first captured image, and identifies the object as being part of an object class (e.g., bus classification). In the implementation, a maximum disparity determination module determines a size parameter of the object (e.g., a bounding width of a bounding box for the bus), determines a size parameter of the object class (e.g., a class bounding width for the bus classification), and determines the maximum disparity for the object using the following equation, Eq. 1.

$$D_{max} = \frac{b \cdot \Delta u_{veh}}{\min W_{veh}} \quad [\text{Eq. 1}]$$

where $\min W_{veh}$ is the minimum width of the vehicle class; $\Delta u_{veh}$ is the bounding box width of the vehicle class (pixel); and
b is the baseline length.

The system can perform a similar maximum disparity, $D_{max}$, calculation for any object identified in the captured image. The cost function for the disparity map at each object between the two captured images can then vary based on maximum disparity, $D_{max}$. Using a variable $D_{max}$, individualizes the cost function calculations for each object and allows the system to reduce processing time for creating a disparity image map. Many additional benefits of the disclosed arrangements will become apparent upon further discussion below.

Figure 2:
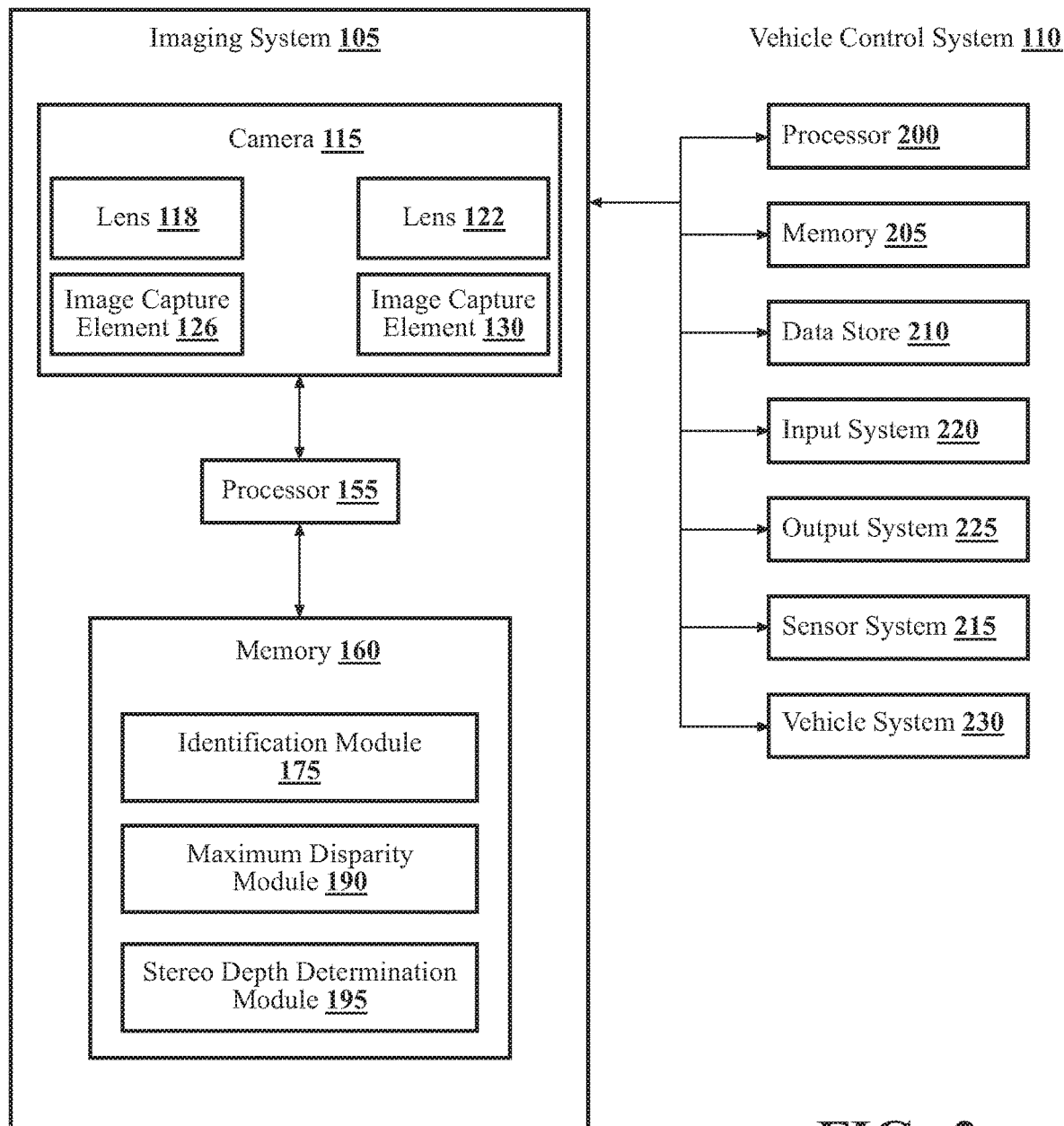
FIG. 2 shows a block diagram of portions of a stereo depth determining system and a vehicle control system used in the vehicle of FIG. 1.

FIG. 1 shows a top view of a vehicle 100 incorporating an imaging system for determining stereo depth. FIG. 2 schematically shows an arrangement for portion of the imaging system 105 that can be used in the vehicle 100 of FIG. 1. FIG. 2 also shows portions of a vehicle control system 110 that can be used in the vehicle 100. With reference to FIG. 1 and FIG. 2, the vehicle 100 includes a stereo camera arrangement (or simply stereo camera 115). The stereo camera 115 includes a first camera lens 118 and a second camera lens 122. The first camera lens 118 and the second camera lens 122 are displaced a distance, b, from one another along an axis, x. Axes x, y, and d are defined with respect to the vehicle 100. The x-axis is the horizontal axis with respect to the vehicle 100, the y-axis is the vertical axis with respect to the vehicle 100, and the d-axis is a depth axis with respect to the vehicle 100. The vehicle can be a means for carrying or transporting something. Example vehicles include an automobile, train, plane, motorcycle, robotic transport, etc. The vehicle 100 is shown as an automobile.

The first camera lens 118 provides electromagnetic waves to a first image capture element 126, and the second camera lens 122 provides electromagnetic waves to a second image capture element 130. The image capture elements 126 and 130 can be any suitable type of image capturing device or system, including, for example, an area array sensor, a Charge Coupled Device (CCD) sensor, a Complementary Metal Oxide Semiconductor (CMOS) sensor, or a linear array sensor, just to name a few possibilities. The image capture elements 126 and 130 may capture images in any suitable wavelength on the electromagnetic spectrum. The image capture elements 126 and 130 may capture color images and/or grayscale images. The lens 118 and 122 can be configured with zoom in and/or zoom out capabilities. While the stereo camera arrangement is shown as having a single camera with multiple lenses, it is envisioned that multiple cameras, each with a respective single lens, can be used to acquire stereo images.

The stereo camera 115 is operatively connected to the outwardly facing surface 135 of the vehicle 100. Operatively connected can include direct or indirect connections, including connections without direct physical contact. Accordingly, the stereo camera 115 can be directly or indirectly connected to the outwardly facing surface 135 of the vehicle 100.

The first camera lens 118 has a field of view 140 extending radially from the outwardly facing lens. The field of view 140 is a portion of the environment 145 within which the first camera lens 118 can detect electromagnetic waves via the lens and the first image capture element 126. The second camera lens 122 also has a field of view 150 extending radially from its outwardly facing lens. The first field of view 140 and the second field of view 150 have different perspectives. Perspective is a point of view of a lens (or camera) with respect to the environment 145.

The first camera lens 118 and the second camera lens 122 are configured to capture images. An image is a digital representation of a scene for an environment 145 as captured by a lens, respectively. Capturing an image refers to the act of obtaining and recording an image data file of the digital representation. The scene 152 or 153 is the portion of the environment 145 observed through the field of view 140 or 150, respectively. The first image 165 (FIG. 3A) captured by the stereo camera 115 corresponds to the field of view 140 of the first camera lens 118. The second image 170 (FIG. 3B) captured by the stereo camera 115 corresponds to the field of view 150 of the second camera lens 122. Additionally, the first image 165 shares the perspective of the first camera lens 118 and the second image 170 shares the perspective of the second camera lens 122. The scene 152 and the perspective of the first image 165 is slightly different than the scene 153 and the perspective of the second image 170 since the lens are displaced.

Referring back to FIG. 2, the imaging system 105 has a processor 155 and a memory 160. While the arrangement of FIG. 2 shows a single processor and a single memory, it is envisioned that many other arrangements are possible. For example, each camera, if multiple cameras are used, can include a distinct processor and memory. It is also envisioned that the processor 155 and memory 160, and their related functionality, can be implemented by the vehicle control system 110 (e.g., as part of the processor and memory, discussed below, of the vehicle control system 110).

The processor 155 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 155 can include a hardware circuit (e.g., an integrated circuit) configured to carry out instructions contained in program code. In arrangements in which there are a plurality of processors, such processors can work independently from each other or one or more processors can work in combination with each other.

The imaging system 105 includes a memory 160 for storing one or more types of data. The memory store can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 160 can be a component of the processor 155, or the memory 160 can be operatively connected to the processor 155 for use thereby. The memory 160 can be located remotely from the imaging system 105 and accessible by the imaging system 105, such as via a communications device or data bus.

In one or more arrangements, the memory 160 can include various instructions stored thereon. For example, the memory 160 can store one or more modules. Modules can be or include computer-readable instructions that, when executed by the processor 155, cause the processor 155 to perform the various functions disclosed herein. While functions may be described herein for purposes of brevity, it is noted that the functions are performed by the processor 155 using the instructions stored on or included in the various module described herein. Some modules may be stored remotely and accessible by the processor 155 using, for instance, various communication devices and protocols.

The memory 160 can store an identification module 175. The identification module 175 includes instructions to determine one or more objects (e.g., first object 180 and second object 185 in FIG. 3A) in an image (e.g., in first image 165). The identification module 175 can further include instructions to classify the object for each identified object. For the example in FIG. 3A, the identification module determines the first object 180 is in the class of cars and the second object 185 is in the class of buses. The identification module 175 can also include instructions to extract object(s) represented in a second image (e.g., the second image 170) of a stereoscopic pair of images. However, only one of the images (e.g., first image 165) may need to be processed by the identification module 175 for the maximum disparity module, discussed below.

The identification module 175 further includes instructions to generate a bounding perimeter for the one or more objects. For example, the identification module 175 creates a first bounding perimeter 182 for the first object 180 and a second bounding perimeter 187 for the second object 185. The first bounding perimeter 182 and the second bounding perimeter 187 are shown as bounding boxes. However, it is envisioned that more refined bounding perimeters can be used.

The memory 160 can store a maximum disparity module 190 (FIG. 2). The maximum disparity module 190 includes instructions to determine a maximum disparity $D_{max}$ for one or more objects. The maximum disparity module 190 can receive data from the identification module 175, and calculate a maximum disparity $D_{max}$ in response to the data. The maximum disparity $D_{max}$ can be a single value for an image (e.g., first image 165). In some other implementations, multiple maximum disparities $D_{max}$ can be calculated for each object (e.g., first object 180 and second object 185) in an image (e.g., first image 165). In one implementation, the maximum disparity $D_{max}$ is calculated using the equation, Eq. 1, which is set forth in the description above.

Figure 3A:
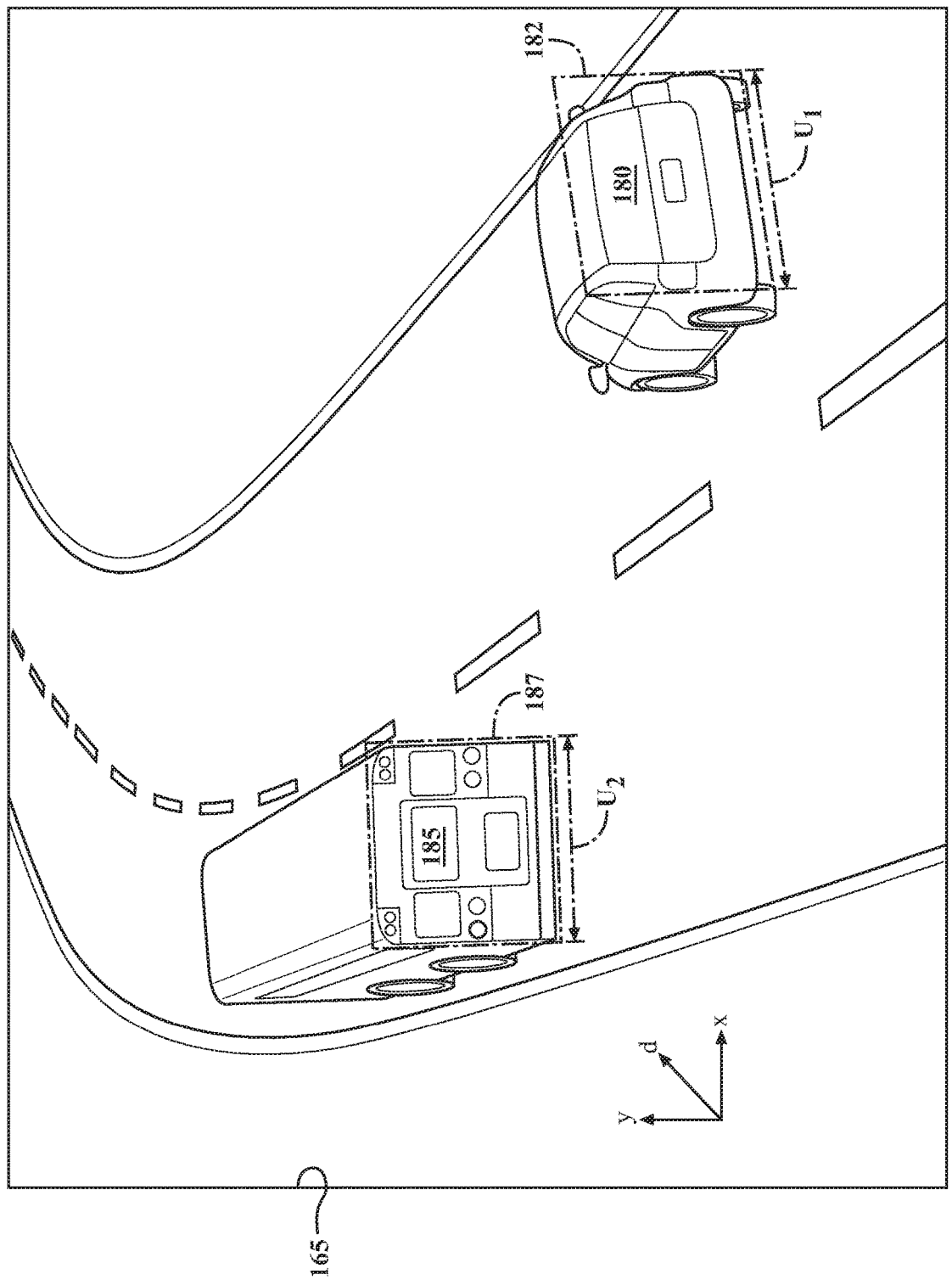
FIG. 3A shows an example first image of a scene.
Figure 3B:
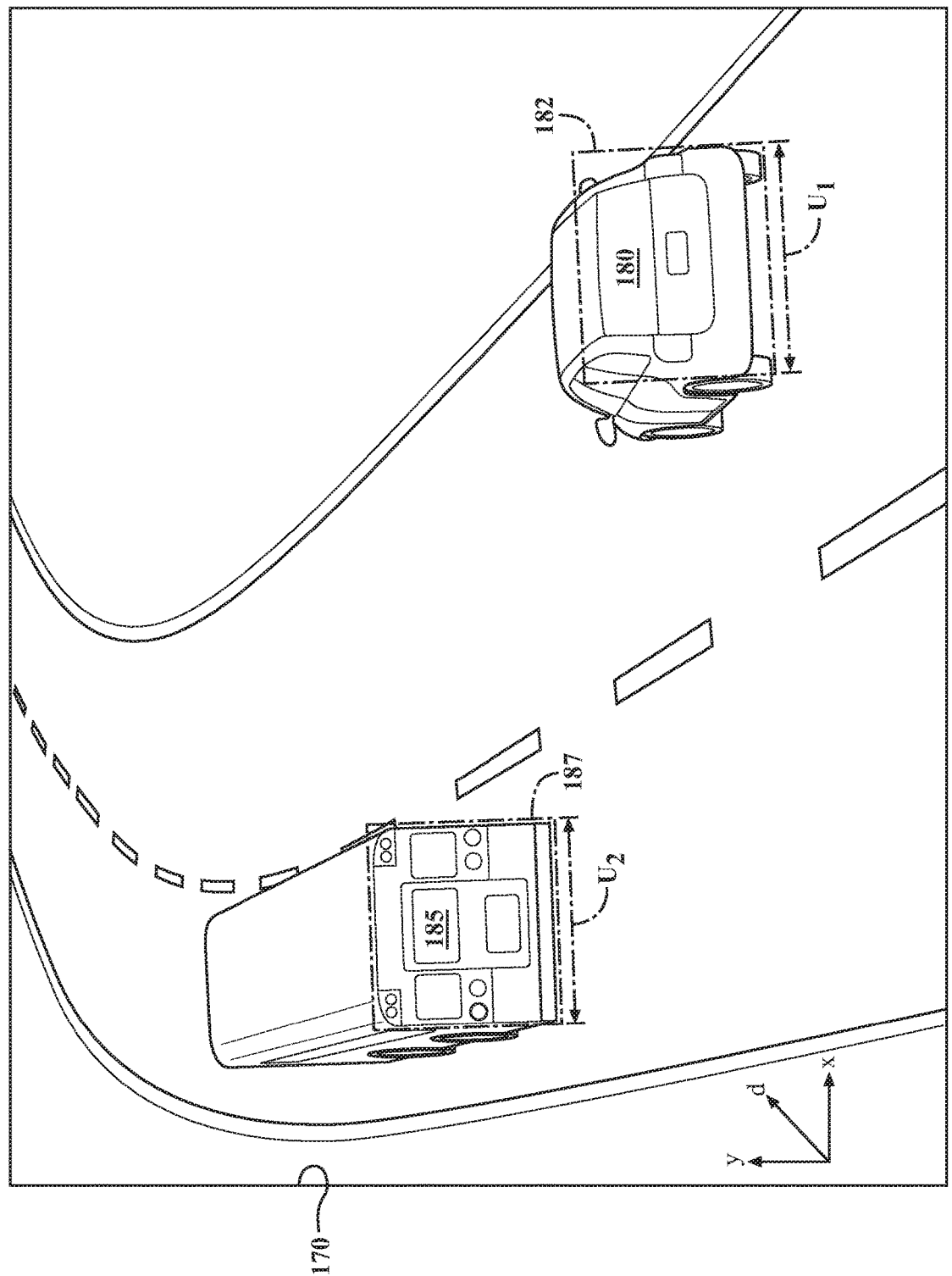
FIG. 3B shows an example second image of a scene.

Accordingly, for equation, Eq. 1, the maximum disparity module 190 obtains a baseline length, b. The baseline length, b, is the horizontal distance between the first camera lens 118 and the second camera lens 122. The maximum disparity module 190 determines a bounding parameter (e.g., a bounding box width $U_1$) and a class parameter for the object class. The bounding parameters in FIG. 3A are shown as bounding box widths. However, it is envisioned that other size parameters can be used. Other example size parameters include bounding box height, bounding box perimeter length, bounding box area, and bounding box diagonal. The class parameter has an association with the bounding parameter. For example, the class parameter in equation, Eq. 1, is a minimum class width since the bounding parameter is bounding box width. If bounding box height was used, then the class parameter in equation, Eq. 1, would be a minimum class height. In some implementations, the class parameter is the minimum size parameter for the class. For example, if the identified class is bus, then the class parameter can be a minimum width for the class of buses. The resultant maximum disparity value is in a number of pixels for the image.

The stereo depth determination module 195 can include instructions to determine the stereo depth based on the stereo images (i.e., the first stereo image 165 and the second stereo image 170) and the maximum disparity $D_{max}$. The stereo depth determination module 195 can include instructions to determine a distance in pixels between a location of the object (e.g., first object 180) represented in the first image (e.g., first image 165) and a location of the object represented in the second image (e.g., second image 170). The stereo depth determination module 195 can include instructions to generate a disparity map based on the determined distance in pixels between the locations of objects represented in the respective images.

The stereo depth determination module 195 can include instructions to obtain a distance in the d-axis between the cameras and an object (e.g., first object 180) represented in both the first image 165 and the second image 170. Determining this distance ultimately determines the distance from the vehicle 100 to the first object 180. The stereo depth determination module 195 can include instructions to determine the distance using several inputs.

For example, given a first object 180 seen in both the first image 160 and the second images 170, the depth can be determined using stereo triangulation techniques. For example, the pixel locations of the object at the two different positions of the imaging system 105 form two corners of a triangle. Because the distance between the different positions is known, in pixels, the length of the side between those two corners is also known. This information, plus a mathematical model of the camera (i.e., the lens of the stereo camera), can be utilized to construct the rest of the model, and thereby provide the distance between the first object 180 and the stereo camera 115 (i.e., the depth). Note that, where the camera arrangement is implemented on a moving vehicle, for instance, additional information may be required, such as a distance traveled by the vehicle.

Referring to FIG. 2, the vehicle control system 110 will now be discussed in full detail as an example vehicle control system. In one or more implementations, the vehicle 100 is highly automated or completely automated. In one implementation, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route. Thus, in one or more implementations, the vehicle 100 operates autonomously according to a particular defined level of autonomy. For example, the vehicle 100 can operate according to the Society of Automotive Engineers (SAE) automated vehicle classifications 0-5.

The vehicle control system 110 can include a processor 200 and a memory 205. In one or more arrangements, the processor 200 and the memory 205 can be a main processor and memory of the vehicle 100. For instance, the processor 200 can be an electronic control unit (ECU). Similar to the processor 155 and the memory 160 discussed earlier, the processor 200 and the memory 205 are shown as a single processor and memory. However, it is envisioned that many other arrangements are possible similar to what was discussed for the processor 155 and memory 160.

The vehicle 100 can include a data store 210 for storing one or more types of data. The data store 210 can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 210 can be a component of the processor 200 or the memory 205, or the data store 210 can be operably connected to the processor 200 for use thereby.

In one or more arrangements, the data store 210 can include map data. The map data can include maps of one or more geographic areas. In some instances, the map data can include information or data on roads, traffic control devices, road markings, structures, features, and/or landmarks in the one or more geographic areas. The map data can be in any suitable form. In some instances, the map data can include ground views of an area, including 360-degree ground views. The map data can include measurements, dimensions, distances, and/or information for one or more items included in the map data and/or relative to other items included in the map data. The map data can be high quality and/or highly detailed.

In one or more arrangement, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) can have location data, size data, dimension data, material data, and/or other data associated with it. The static obstacle map(s) can include measurements, dimensions, distances, and/or information for one or more static obstacles. The static obstacle map(s) can be high quality and/or highly detailed. The static obstacle map(s) can be updated to reflect changes within a mapped area.

The data store 210 can include sensor data. In this context, sensor data means any information about the sensors that the vehicle 100 is equipped with, including the capabilities and other information about such sensors. As will be explained below, the vehicle 100 can include the sensor system 215. The sensor data can relate to one or more sensors of the sensor system 215. Also, while shown separate, the imaging system 105 is a specific example of a sensor system, and intermediate and resultant data can be stored in the data store 210.

In some instances, at least a portion of the map data and/or the sensor data can be located in one or more data stores located onboard the vehicle 100. Alternatively, or in addition, at least a portion of the map data and/or the sensor data can be located in one or more data stores that are located remotely from the vehicle 100.

As noted above, the vehicle 100 can include the sensor system 215. The sensor system 215 can include a sensor. A sensor is a device, component, and/or system that can detect, and/or sense something. The one or more sensors can be configured to detect, and/or sense in real-time. As used herein, real-time means a level of processing responsiveness that a user or system senses as sufficiently immediate for a particular process or determination to be made, or that enables the processor to keep up with some external process.

In arrangements in which the sensor system 215 includes a plurality of sensors, the sensors can function independently from each other. Alternatively, two or more of the sensors can work in combination with each other. In such a case, the two or more sensors can form a sensor network. The sensor system 215 and/or the one or more sensors can be operably connected to the processor 200, the data store 210, and/or another element of the vehicle 100. The sensor system 215 can acquire data of at least a portion of the external environment of the vehicle 100 (e.g., nearby vehicles).

Various examples of different types of sensors include one or more vehicle sensors and one or more environment sensors. The vehicle sensor(s) can detect, determine, and/or sense information about the vehicle 100 itself. The environment sensor(s) can detect, determine, and/or sense information about the driving environment data. Driving environment data includes data or information about the external environment in which a vehicle is located or one or more portions thereof. For example, one environment system can be the imaging system 105 and one environment sensor includes the stereo camera arrangement, which can be configured to detect, quantify, and/or sense obstacles in at least a portion of the environment 145 of the vehicle 100 and/or information/data about such obstacles. Such obstacles may be stationary objects and/or dynamic objects. Other environment sensors can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

The vehicle 100 can include an input system 220. An input system includes any device, component, system, element or arrangement or groups thereof that enable information/data to be entered into a machine. The input system 220 can receive an input from a vehicle passenger (e.g. a driver or a passenger). The vehicle 100 can include an output system 225. An output system includes any device, component, or arrangement or groups thereof that enable information/data to be presented to a vehicle passenger (e.g. a person, a vehicle passenger, etc.).

The vehicle 100 can include one or more vehicle systems 230. The vehicle 100 can include a propulsion system, a braking system, a steering system, a throttle system, a transmission system, a signaling system, and/or a navigation system. Each of these systems can include one or more devices, components, and/or combination thereof, now known or later developed.

The processor 200 and the imaging system 105, among other systems, can be operably connected to communicate with the various vehicle systems 230 and/or individual components thereof. For example, the processor 200 and/or the stereo depth detection module 195 can be in communication with, and send and/or receive information to the various vehicle systems 230 to control the movement, speed, maneuvering, heading, direction, etc. of the vehicle 100.

For instance, the processor 200, based on information from the stereo depth determination module 195, may cause a vehicle system to control the direction and/or speed of the vehicle 100. The processor 200 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). Cause or causing means to make, force, compel, direct, command, instruct, and/or enable an event or action to occur or at least be in a state where such event or action may occur, either in a direct or indirect manner.

Figure 4:
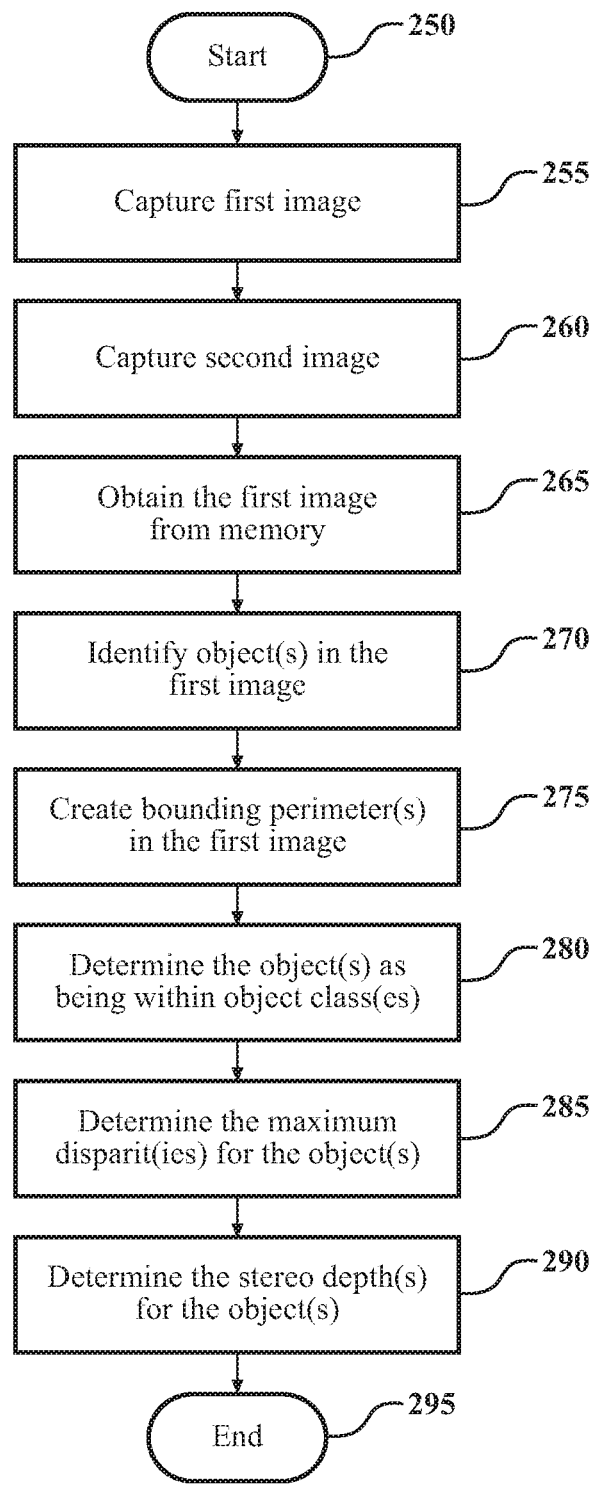
FIG. 4 is a flowchart depicting an example method of determining stereo depth of an object.

Now that various aspects of the vehicle 100 have been described, a method of determining stereo depth of an object from a vehicle will be described with reference to FIG. 4. The flowchart shown in FIG. 4 provides only one example of determining stereo depth of an object. The following disclosure should not be limited to each and every function block shown in FIG. 4. To the contrary, the method does not require each and every function block shown. In some examples, the method may include additional function blocks. Further, the method does not need to be performed in the same chronological order shown in FIG. 4.

The method can begin at starting block 250. At block 255, the stereo camera 115, via the first camera lens 118, captures the first image 165, and at block 260, the stereo camera 115, via the second camera lens 122, captures the second image 170. As stated above, the stereo camera 115 can be operatively connected on a surface 135 of the vehicle 100. The first image 165 is a first partial image of the environment 145 as viewed with a first perspective. The second image 170 is a second partial image of the environment 145 as viewed with a second perspective. The first image 165 and the second image 170 are slightly different from one another because the first and second perspectives are slightly different from one another.

As part of blocks 265-275, the processor 155 receives and executes instructions from the memory 160 to cause the processor to implement the identification module 175. In one implementation, the processor 155 obtains (e.g., either from the stereo camera 115 or from memory) the captured first image 165 (block 265). The identification module 175 identifies one or more objects (e.g., first object 180) within the first image (block 270). After the identification of the objects, the processor 155 can creating a bounding perimeter (block 275). For example, the bounding perimeter can be a bounding box (e.g., the first bounding perimeter 182) as shown in FIG. 3A. The bounding perimeter can be identified using edge analysis for the first object 180.

As part of blocks 280 and 285, the processor 155 receives and executes instructions from the memory 160 to cause the processor to implement the maximum disparity module 190. At block 280, the processor 155 identifies the one or objects as being part of an object class. For example, the first object 180 can be defined as being within the class of cars, and the second object 185 can be defined as being within the class of buses.

At block 285, the processor determines the maximum disparity for the object(s). In one example, the maximum disparity module obtains information related to the first object 180, including the class for the first object 180, and information related to the distance, b, between the first camera lens 118 and the second camera lens 122. Using the acquired information, the maximum disparity can be calculated using the equation, Eq. 1, which is set forth in the above description. The result value of max disparity, $D_{max}$, is a pixel value. As explained above, other bounding parameters besides bounding box width can be used. The block 285 can be repeated for all of the objects in the first image 165.

At block 290, the processor 155 receives and executes of instructions from the memory 160 to cause the processor to implement the stereo depth determination module 195. For block 290, the processor determines a stereo depth of the object using the maximum disparity. In one implementation, the processor 155 obtains the first image 165, the second image 170, and the maximum disparity $D_{max}$. The stereo depth determination module 195 can use known techniques for determining a stereo disparity map. An example cost function that can be used to calculate the stereo disparity map is sum of square differences (SSD). Other cost functions are disclosed in the references incorporated earlier. No matter what kind of cost function that is used, the computational cost is affected by how large the maximum disparity $D_{max}$ is from the minimum disparity. The invention makes the maximum disparity $D_{max}$ variable to help reduce computational cost. Having a variable maximum disparity $D_{max}$ reduces processing time for the cost function. Moreover, when the maximum disparity $D_{max}$ is variable for each identified object, the computational cost can be reduced further. With the disparity map, the stereo depth for an object can be determined.

At block 295, the method can end. The method of FIG. 4 can provide sensor data to the processor 200 for vehicle operation as discussed above with FIG. 2. The method in FIG. 4 can be continually called, particularly as the vehicle moves.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the drawings, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may be executed entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for determining stereo depth of an object, the system comprising:
 a processor; and
 a memory communicably coupled to the processor and storing:
  an identification module including instructions that when executed by the processor cause the processor to identify an object in an image, determine a bounding perimeter for the object, and determine an object class for the object, the image being of a portion of an environment, the image being captured with a stereo camera arrangement having a first camera lens and a second camera lens separated by a baseline length;
  a maximum disparity determination module including instructions that when executed by the processor cause the processor to determine a size parameter of the object in the image based at least on a width of the bounding perimeter, determine a size parameter of the object class based at least on a minimum width of the object class, and determine a maximum disparity for the object, with the maximum disparity being a fraction of the baseline length determined according to a ratio of the size parameter of the object to the size parameter of the object class; and
  a stereo depth determination module including instructions that when executed by the processor cause the processor to determine a stereo depth of the object based on the image and the maximum disparity.

2. The system of claim 1, wherein the stereo depth determination module further includes instructions to determine the stereo depth at least in part by creating a disparity map with a cost function using a minimum disparity and the maximum disparity.

3. The system of claim 1, wherein the system is installed in one of a vehicle and a robotic apparatus.

4. The system of claim 1, wherein the object class is one of a car, a bus, a truck, a trailer, a pedestrian, an animal, and a sign.

5. The system of claim 1, wherein the identification module further includes instructions that when executed by the processor cause the processor to identify a bounding perimeter for the object, and
wherein the maximum disparity determination module further includes instructions to determine the size parameter of the object by determining a size parameter of the bounding perimeter.

6. The system of claim 5, wherein the bounding perimeter is a bounding box, and wherein the size parameter is one of a bounding box width, a bounding box height, a bounding box perimeter length, a bounding box area, and a bounding box diagonal.

7. The system of claim 1, wherein the parameter of the object class is associated with the parameter of the object.

8. The system of claim 1, wherein the size parameter is a real-world minimum width of the object class.

9. A non-transitory computer-readable medium for determining stereo depth of an object, the non-transitory computer-readable medium storing instructions that when executed by a processor cause the processor to:
obtain an image of a portion of an environment, the image being captured with a stereo camera arrangement having a first camera lens and a second camera lens separated by a baseline length;
identify an object in the image;
determine a bounding perimeter for the object;
determine an object class for the object;
determine a size parameter of the object in the image based at least on a width of the bounding perimeter;
determine a size parameter of the object class based at least on a minimum width of the object class;
determine a maximum disparity for the object, with the maximum disparity being a fraction of the baseline length determined according to a ratio of the size parameter of the object to the size parameter of the object class; and
determine a stereo depth of the object based on the maximum disparity.

10. The non-transitory computer-readable medium of claim 9, wherein the instructions to determine the stereo depth include creating a disparity map with a cost function using a minimum disparity and the maximum disparity.

11. The non-transitory computer-readable medium of claim 9, wherein the non-transitory computer-readable medium further stores instructions that when executed by the processor cause the processor to:
identify a second object in the image, the second object being different than the object;
determine an object class for the second object;
determine a second size parameter of the second object;
determine a second size parameter of the object class for the second object; and
determine a second maximum disparity for the second object with the second size parameter of the object and the second size parameter of the object class for the second object; and
determine a second stereo depth of the second object based on the second maximum disparity.

12. The non-transitory computer-readable medium of claim 9, wherein the instructions to identify the object include identifying a bounding perimeter for the object.

13. A method of determining stereo depth of an object, the method comprising:
obtaining an image of a portion of an environment, the image being captured with a stereo camera arrangement having a first camera lens and a second camera lens separated by a baseline length;
identifying an object in the image;
determining a bounding perimeter for the object;
determining an object class for the object;
determining a size parameter of the object in the image based at least on a width of the bounding perimeter;
determining a size parameter of the object class based at least on a minimum width of the object class;
determining a maximum disparity for the object, with the maximum disparity being a fraction of the baseline length determined according to a ratio of the size parameter of the object to the size parameter of the object class; and
determining a stereo depth of the object based on the maximum disparity.

14. The method of claim 13, wherein obtaining the image captured with the stereo camera arrangement includes capturing the image using a camera, storing the captured image in a memory, and obtaining the image from the memory.

15. The method of claim 13, wherein the maximum disparity is a measurement related to a number of pixels in the image, and wherein determining the stereo depth includes creating a disparity map with a cost function using a minimum disparity and the maximum disparity.

16. The method of claim 13, further comprising:
identifying a second object in the image, the second object being different than the object;
determining an object class for the second object;
determining a second size parameter of the second object;
determining a second size parameter of the object class for the second object; and
determining a second maximum disparity for the second object with the second size parameter of the object and the second size parameter of the object class for the second object; and
determining a second stereo depth of the second object based on the second maximum disparity.

17. The method of claim 13, wherein identifying the object includes identifying a bounding perimeter for the object.

18. The method of claim 17, wherein the size parameter of the object is one of a width, a height, a perimeter length, an area, and a cross section diagonal.

* * * * *